United States Patent
Bennett et al.

(10) Patent No.: US 10,071,779 B1
(45) Date of Patent: Sep. 11, 2018

(54) VEHICLE CARGO SUPPORT BRACKET

(71) Applicant: UTILITY TRAILER MANUFACTURING COMPANY, City of Industry, CA (US)

(72) Inventors: Jeffrey Bennett, South Pasadena, CA (US); Raffy Tony Afarian, Yorba Linda, CA (US); Gary K. Cyr, Pomona, CA (US)

(73) Assignee: UTILITY TRAILER MANUFACTURING COMPANY, City of Industry, CA (US)

( * ) Notice: Subject to any disclaimer, the term of this patent is extended or adjusted under 35 U.S.C. 154(b) by 8 days.

(21) Appl. No.: 15/700,507

(22) Filed: Sep. 11, 2017

Related U.S. Application Data

(63) Continuation of application No. 15/174,867, filed on Jun. 6, 2016, now Pat. No. 9,796,438.

(51) Int. Cl.
B62D 63/06 (2006.01)
(52) U.S. Cl.
CPC .................................. B62D 63/06 (2013.01)
(58) Field of Classification Search
CPC .................................................... B62D 63/06
USPC ....... 280/781, 785, 787, 788, 797, 800, 107; 296/29, 30, 204, 187.09; 403/365, 408.1
See application file for complete search history.

(56) References Cited

U.S. PATENT DOCUMENTS

| 3,077,357 | A | | 2/1963 | Rugg | |
|---|---|---|---|---|---|
| 4,920,696 | A | * | 5/1990 | Mawby | F25D 23/006 248/674 |
| 5,185,971 | A | * | 2/1993 | Johnson, Jr. | A47B 57/408 211/94.01 |
| 5,392,581 | A | | 2/1995 | Hatzinikolas | |
| 5,407,310 | A | * | 4/1995 | Kassouni | B29C 70/76 29/525.02 |
| 5,417,401 | A | * | 5/1995 | Thompson | F24F 1/027 248/300 |
| 5,816,008 | A | | 10/1998 | Holtmann | |
| 6,113,144 | A | * | 9/2000 | Lapic | B60G 7/02 280/124.155 |
| 6,886,799 | B2 | * | 5/2005 | Yamanashi | B60H 1/00535 248/300 |
| 7,516,974 | B1 | | 4/2009 | Mann | |
| 7,765,771 | B2 | | 8/2010 | Serpico | |
| D646,840 | S | * | 10/2011 | Polka | D26/138 |

(Continued)

OTHER PUBLICATIONS

Fontaine Trailer—between main trailer beams.

(Continued)

Primary Examiner — Darlene P Condra
(74) Attorney, Agent, or Firm — Karish & Bjorgum, PC

(57) ABSTRACT

A structural assembly for load carrying chassis of vehicles includes beams extending fore and aft on the chassis with passages laterally through the beam webs. I-beams extend through the passages through the beams. Brackets are fixed to the principal beams at the passages. The brackets each include a bracket web, a bracket flange extending from the bracket web and two bosses on the bracket web extending past the bracket flange. The bosses of each of the brackets extend to either side of lower I-beam flanges. The bracket flanges extend through the passages in contact with the beams in the passages. The brackets are shown as integrally formed or as composite assemblies of a plate and an extrusion.

10 Claims, 5 Drawing Sheets

(56) References Cited

U.S. PATENT DOCUMENTS

| | | | |
|---|---|---|---|
| 2002/0074788 A1* | 6/2002 | Fujimoto | B62D 21/11 |
| | | | 280/781 |
| 2005/0069833 A1 | 3/2005 | Chikami | |
| 2008/0110218 A1 | 5/2008 | Allen | |
| 2009/0056185 A1 | 3/2009 | Wamsley | |
| 2009/0146456 A1* | 6/2009 | Saitou | B62D 25/084 |
| | | | 296/187.09 |
| 2013/0127146 A1* | 5/2013 | Ohno | B60K 15/063 |
| | | | 280/781 |
| 2015/0059259 A1 | 3/2015 | Hatzinikolas | |
| 2015/0284968 A1 | 10/2015 | Simmons | |
| 2015/0353138 A1 | 12/2015 | Fenton | |
| 2015/0375663 A1 | 12/2015 | Robertson | |
| 2016/0305113 A1 | 10/2016 | Hatzinikolas | |

OTHER PUBLICATIONS

Fontaine Trailer—outside of main trailer beam.
Hyundai Trailer—outside of main trailer beam (steel).
Hyundai Trailer—outside of main trailer beam (aluminum).
Manac Trailer—inside & outside of main trailer beam.
Reitnouer Trailer—outside of main trailer beam.
Great Dane Trailer—outside of main trailer beam.

\* cited by examiner

VEHICLE CARGO SUPPORT BRACKET

This Application is a continuation of U.S. patent application Ser. No. 15/174,867, filed Jun. 6, 2016, the disclosure of which is incorporated herein by reference in its entirety.

BACKGROUND OF THE INVENTION

The field of the present invention is structural design of vehicle cargo beds.

Cargo carrying trailers of all types including full trailers and semi-trailers, whether flatbed, enclosed or specialty fabrication, benefit from weight reduction in view of fuel costs and environmental considerations. As a result, such vehicles are employing lighter materials and enhanced structural design.

The foregoing changes have resulted in issues regarding incompatibility of different metals, changes in direct and fatigue strength and compatible assembly mechanisms. This has all translated into new design requirements and increased labor costs in assembly.

SUMMARY OF THE INVENTION

The present invention is directed to the structural arrangement for load carrying chassis including trailers. Trailers have traditionally included principal beams extending fore and aft with lateral beams supported by the principal beams and in turn supporting the floor of the vehicle. The present invention employs the elongate principal beam and lateral beam structural arrangement with a bracket to associate these components. The brackets are fixed to the principal beams at passages extending through the principal beams for receipt of the lateral beams. The brackets include a bracket web and bracket flange with the bracket flange extending perpendicular from the bracket web. The bracket flange extends with an associated lateral beam through the passage in the principal beam. Bosses extend past the bracket flange to either side of the associated lateral beam. The bracket thus supports the lateral beam and assures secure alignment between the bracket and lateral beam at an associated passage through a principal beam.

In another aspect of the invention, the bracket flange may rest on a lateral passageway of a principal beam as a means for passing the load from the lateral beam to the longitudinal principal beam directly through the flange. A fastener at the bracket web may be employed to retain the bracket on the principal beam. With the flange carrying the load of the associated lateral beam at the passage on the principal beam, the fastener is relieved of vertical load. With the load thus directed and the bosses confirming position and alignment, a single non-orienting fastener such as a common bolt can be sufficient for each bracket.

In a further aspect of the present invention, the bracket may be comprised of two elements, a flat plate and an extrusion having a flange and a leg perpendicular thereto. These separate pieces are easily separately fabricated in high volume. The flat plate includes the bosses thereon while the extrusion provides the bracket flange. The plate and the leg of the extrusion together form the bracket web, all to be fixed together on the web of the principal beam by a fastener.

Accordingly, it is a principal object of the present invention to provide an improved trailer structure and mechanism for assembly thereof. Other and further objects and advantages will appear hereinafter.

DETAILED DESCRIPTION OF THE PREFERRED EMBODIMENT

Figure 1:
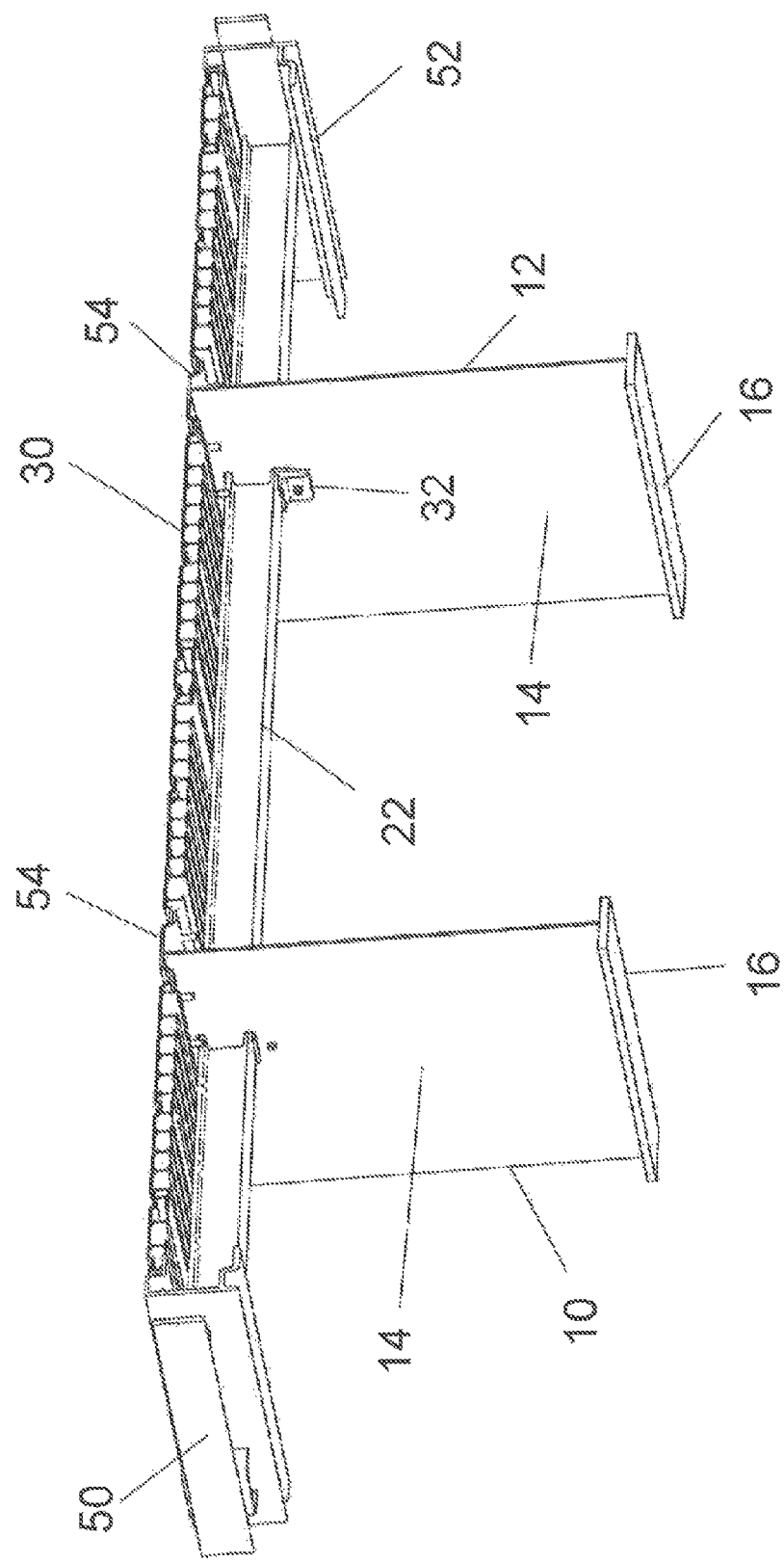
FIG. 1 is a perspective view of a trailer section cut transversely through the principal beams.
Figure 2:
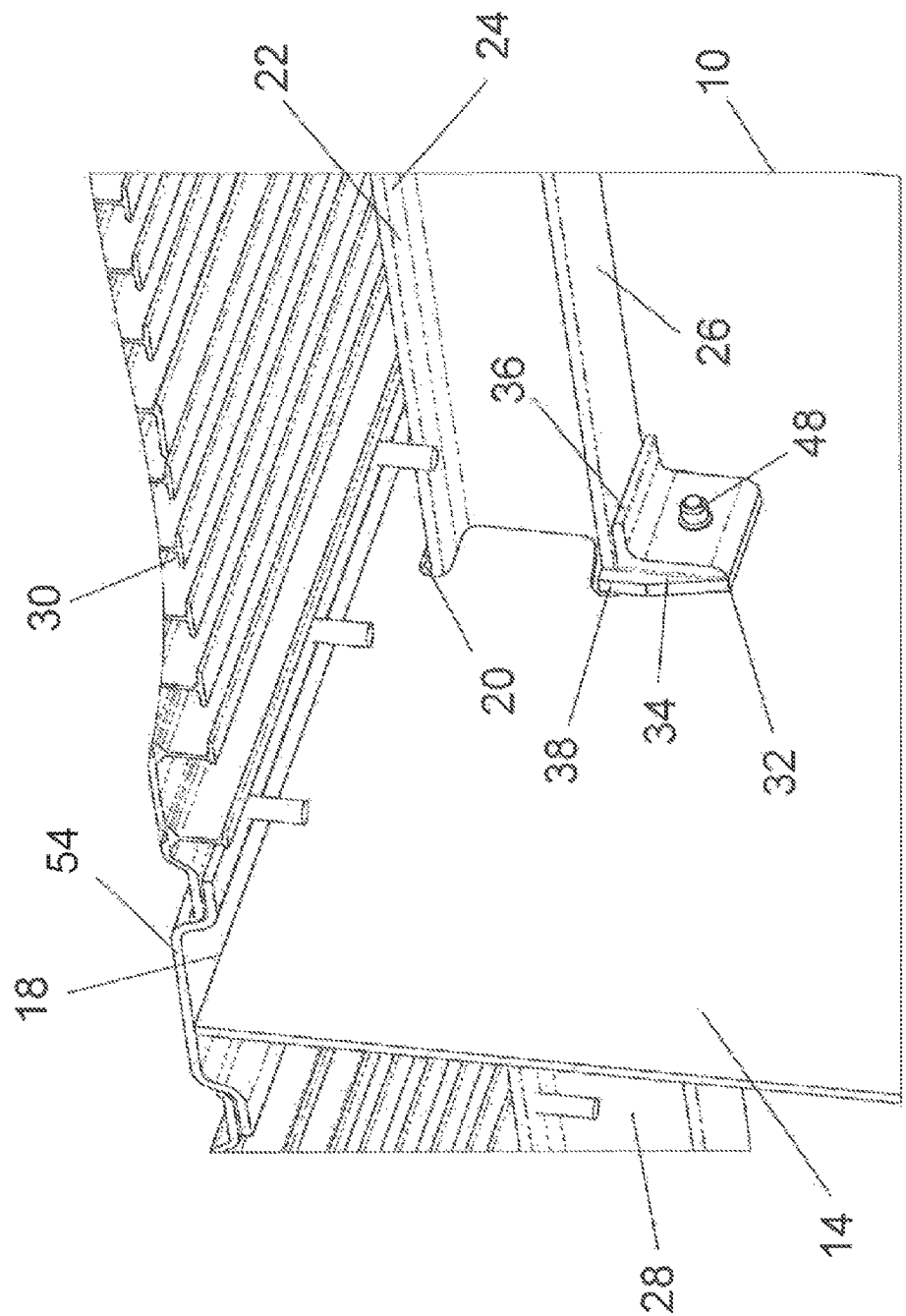
FIG. 2 is a detail perspective view of a bracket support for a lateral beam on a principal beam of the trailer.
Figure 3:
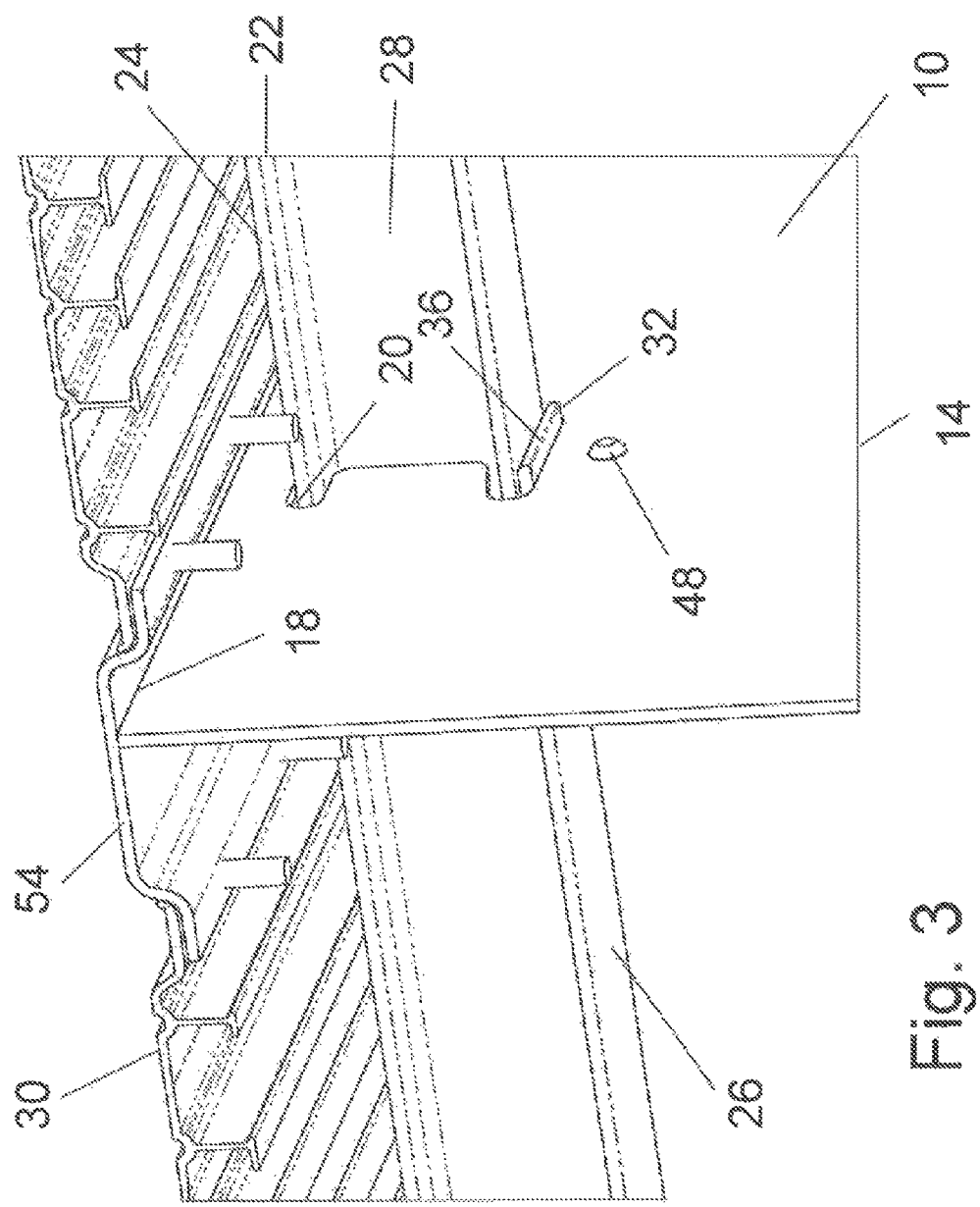
FIG. 3 is a detail perspective view of the bracket of FIG. 2 illustrated from the other side of the principal beam of the trailer.

Turning in detail to the figures, a transverse trailer section is illustrated in FIG. 1 to include two principal beams 10, 12. These principal beams each include a web 14, a lower flange 16 and an upper side or edge 18 of the web 14. The principal beams 10, 12 extending fore and aft include passageways 20 extending laterally therethrough. These passages 20 are adjacent the narrow upper side 18 of each of the principal beams 10, 12. The passages 20 conveniently have a flat, narrow bottom surface defined by the web 14. The principal beams in the preferred embodiment are steel.

The passages 20 each provide clearance for inserting a lateral I-beam therethrough. The passages 20 traditionally had an I-beam profile reflecting a past practice of welding either side of the web of an I-beam to the sides of the passages. Currently, the profile of the passages 20 may take on any configuration not overly compromising principal beam strength through which a lateral beam may extend.

Lateral beams 22 approximating the width of the trailer bed extend through the lateral passages 20 to define the support plane for the flooring 30 of the trailer bed. I-beams 22 are shown in the preferred embodiment. Box beams and beams of other cross sections are also contemplated. The I-beams 22 include an upper flange 24, lower flange 26 and web 28. In the preferred embodiment, the lateral !-beams are aluminum. Commonly employed nonconductive tape can be used at joints between steel and aluminum throughout the structure.

Brackets 32 mount the lateral I-beams 22 to the principal beams 10, 12. The brackets 32, whether unitary or an assembly, include a bracket web 34 with a bracket flange 36 extending perpendicular to the bracket web 34 at one edge thereof. Two bosses 38, 40 lying in the plane of the bracket web 34 extend past the bracket flange 36 from either side thereof. The brackets 32 in the preferred embodiment are aluminum.

Figure 4:
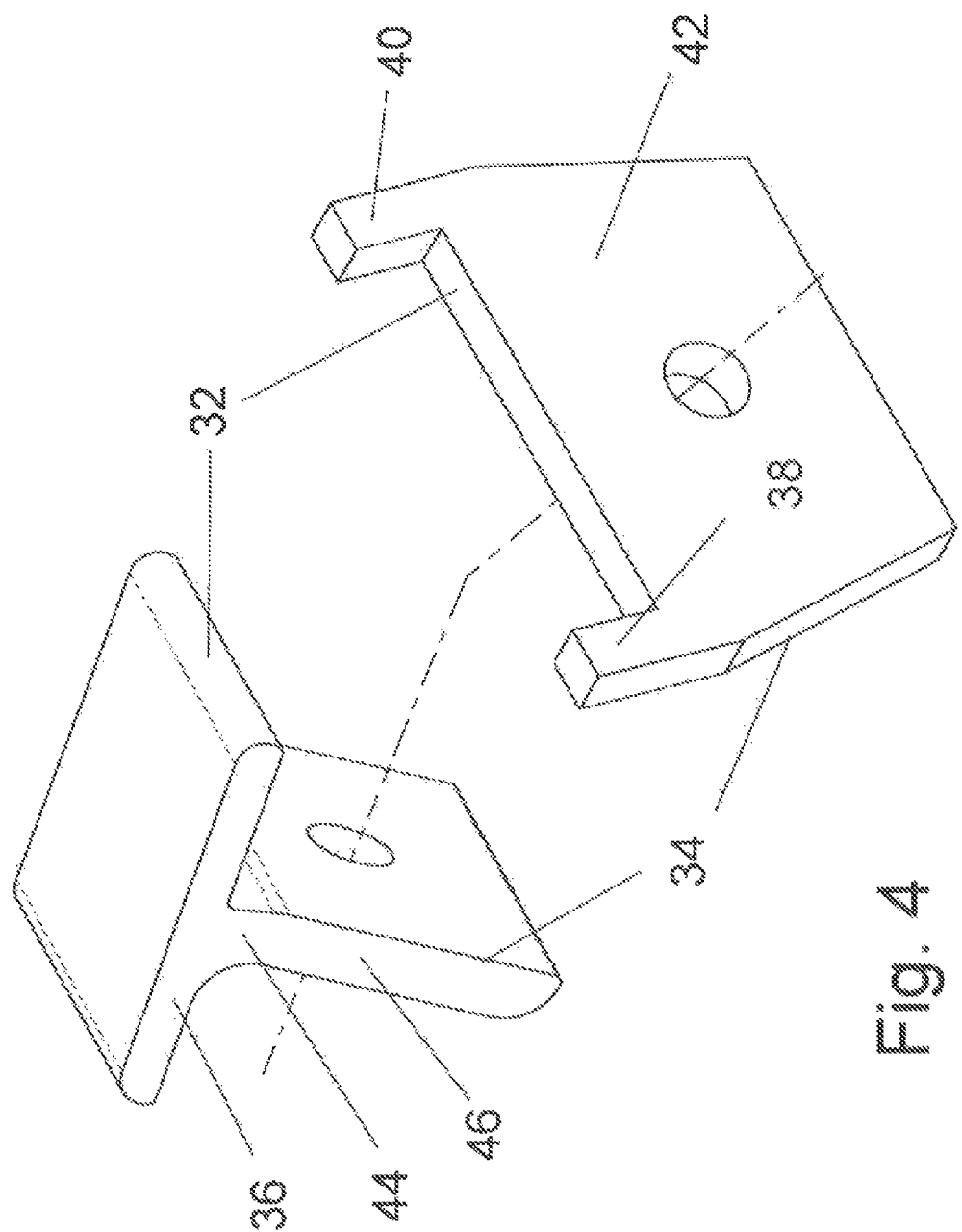
FIG. 4 is an exploded perspective view of a bracket assembly.
Figure 6:
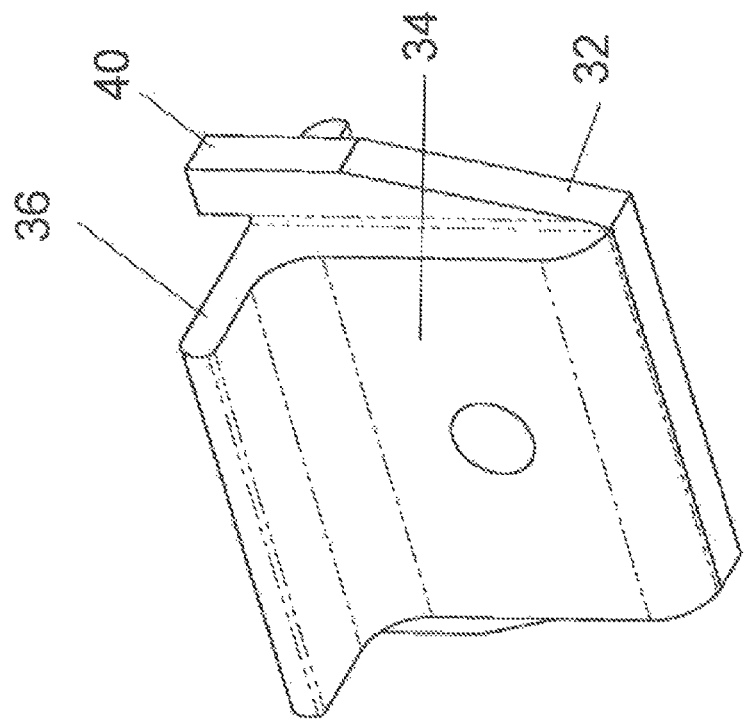
FIG. 6 is a perspective view of a unitary bracket illustrating the free side of the bracket.
Figure 5:
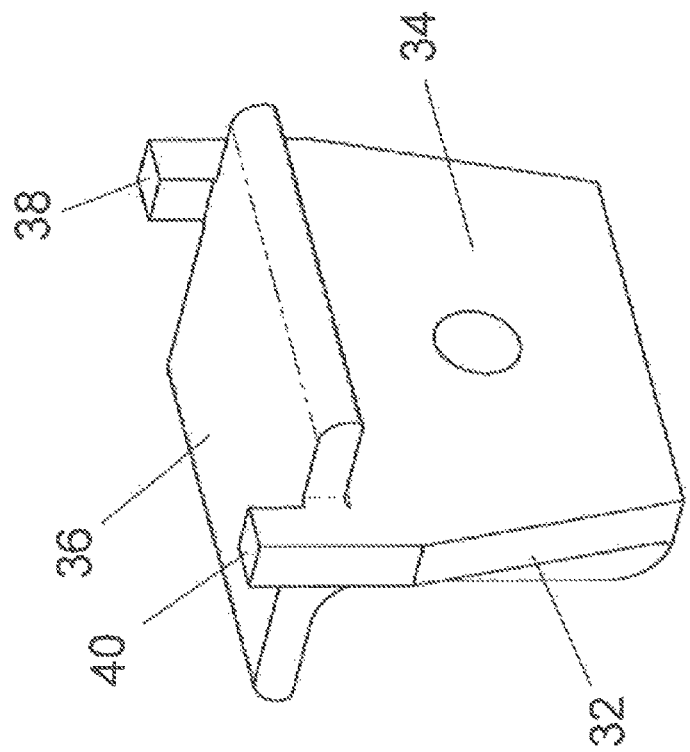
FIG. 5 is a perspective view of a unitary bracket illustrating the attachment side of the bracket.

The brackets 32 may be unitary as illustrated in FIGS. 5 and 6 or an assembly of a plate 42 and an extrusion 44, the plate 42 having a plate surface facing the extension 44 and a periphery as illustrated in FIG. 4. The extrusion 44 includes the bracket flange 36 and a leg 46 forming a T in cross section. The leg 46 and the plate 42 form the bracket web 34 when juxtaposed. The flat plate 42 defines the mutually displaced bosses 38, 40 in the plate periphery. Both embodiments are treated together in the following disclosure.

The brackets 32 support the lateral I-beams 22 on the principal beams 10, 12 at passages 20 through the principal beams 10, 12. The bracket flanges 36 extend through the passages 20 and rest on the flat, narrow bottom surfaces of the passages 20. The lateral I-beams 22 then rest upon the bracket flanges 36. As a result, the vertical loads through the flooring 30 and the lateral I-beams 22 are supported on the principal beams 10, 12 through the bracket flanges 36. Thus positioned, the bosses 38, 40 extend upwardly past the bracket flanges 36 to either side of the lower flanges 26 of the lateral I-beams 22. With other lateral beam cross sections, the bosses 38, 40 are sized to similarly fit at the lower portion of the beams.

A fastener 48, such as a common bolt, retains the bracket 32 against the associated principal beam 10, 12 at the bracket web 34. The bracket web 34 includes a hole to accommodate the fastener. As the bracket flange 36 supports the lateral I-beam 22 on the principal beam 10, 12, there is no major sheer load on the fastener 48 from the vehicle load.

In assembly, the vehicle can conveniently include a bracket 32 with each intersection of a lateral I-beam 22 with one of the principal beams 10, 12. Two brackets 32 are thus used with each lateral I-beam 22. Of course, the lateral I-beams 22 are spaced down the length of the vehicle. Cap beam assemblies 50, 52 extend fore and aft down either side of the trailer at either end of the lateral I-beams 22. A cap plate 54 is positioned atop each of the principal beams 10, 12 and supported thereby. The cap plate 54 is fastened to the flooring 30. The flooring 30 is thus positioned and supported by the cap plate 54 on the principal beams 10, 12, the lateral I-beams 22 and the cap beam assemblies 50, 52.

Thus, an improved structural assembly is described for load carrying chassis of vehicles. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A bracket comprising
   a bracket web;
   a bracket flange, the bracket web extending perpendicularly from the bracket flange and extending laterally beyond the bracket flange at the bracket flange;
   two bosses extending from the bracket web past and beyond the bracket flange with the bracket flange extending between the bosses;
   a plate including a periphery about the plate, a first plate surface extending to the periphery about the plate, and the two bosses; and
   an extrusion including the bracket flange and a perpendicularly depending leg, the bracket web including the leg of the extrusion and the plate with the first plate surface against the leg of the extrusion.

2. The bracket of claim 1, the leg extending from the bracket flange to define a T-cross section with the flange.

3. The bracket of claim 1 further comprising
   mutually aligned holes in the plate and the leg to receive a fastener retaining the first plate surface against the leg with the bosses extending past and beyond the flange.

4. A bracket comprising
   a plate including a periphery about the plate, a first plate surface extending to the periphery about the plate, and two mutually displaced bosses at the periphery about the plate; and
   an extrusion including a flange and a leg extending perpendicularly from the flange, the first plate surface being against the leg, the two bosses extending past and beyond the flange with the flange extending between the mutually displaced bosses.

5. The bracket of claim 4 further comprising
   mutually aligned holes in the plate and the leg to receive a fastener retaining the first plate surface against the leg with the bosses extending past and beyond the flange.

6. The bracket of claim 4, the leg extending from the bracket flange to define a T-cross section with the flange.

7. A bracket comprising
   a bracket web;
   a bracket flange, the bracket web extending perpendicularly from the bracket flange in a first direction and extending laterally beyond the bracket flange at the bracket flange;
   two bosses extending from the bracket web past and beyond the bracket flange in a second direction opposite to the first direction with the bracket flange extending between the bosses.

8. The bracket of claim 7, the bracket web, the bracket flange and the two bosses being one piece.

9. The bracket of claim 7, the bracket flange extending perpendicularly from the bracket web in two directions.

10. The bracket of claim 7, the bracket flange including a leg extending parallel to the bracket web, the bracket further comprising
    mutually aligned holes in the bracket web and bracket flange to receive a fastener retaining the bracket web against the leg with the bosses extending past and beyond the flange.

* * * * *